Sept. 15, 1953     T. C. VAN DEGRIFT ET AL     2,652,517
COMBUSTION CHAMBER PRESSURE INDICATOR
Filed Sept. 28, 1950
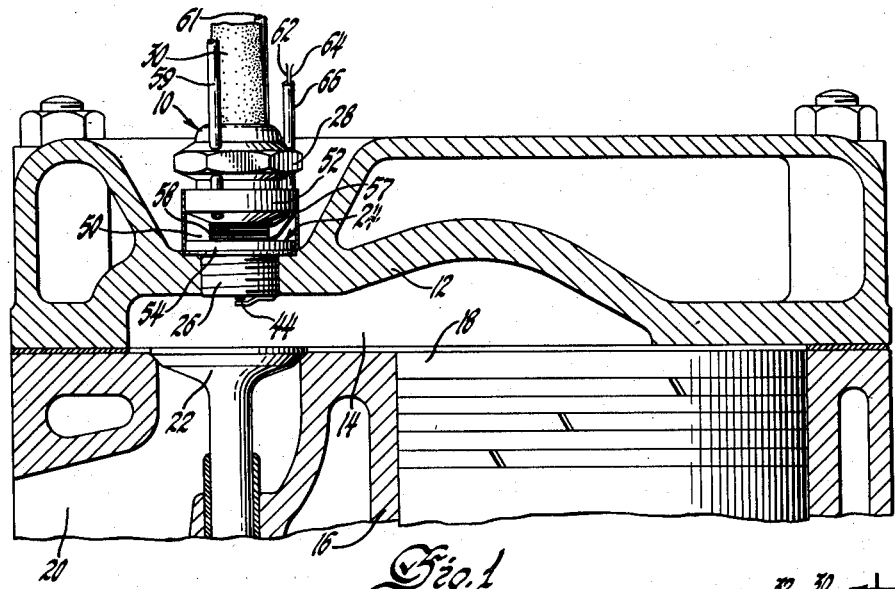
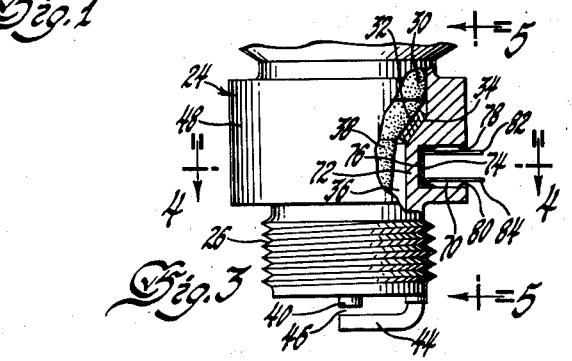
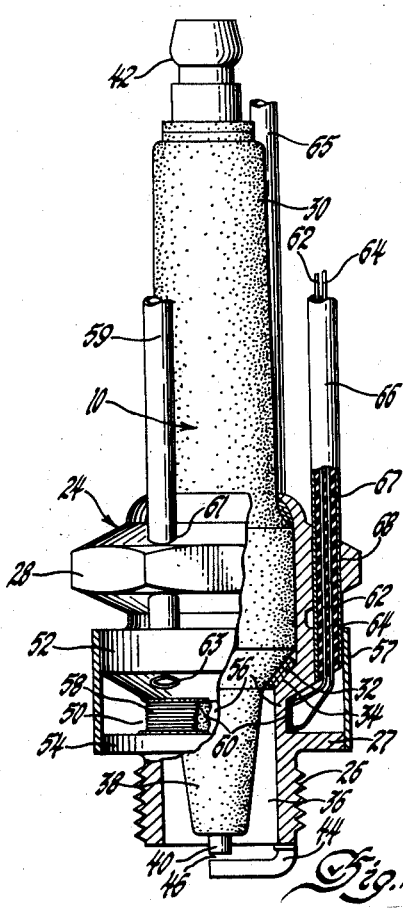
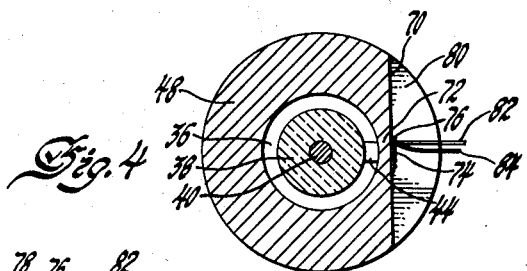
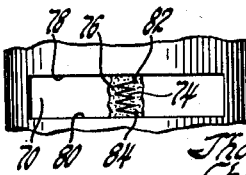
Inventors
Thomas C. Van Degrift,
Charles W. Gadd &
Ralph S. Matsen
By
Willits, Helwig & Baillio
Attorneys Patented Sept. 15, 1953

2,652,517

UNITED STATES PATENT OFFICE 2,652,517

COMBUSTION CHAMBER PRESSURE INDICATOR

Thomas C. Van Degrift, Detroit, Charles W. Gadd, Orchard Lake, and Ralph S. Matsen, Detroit, Mich., assignors to General Motors Corporation, Detroit, Mich., a corporation of Delaware Application September 28, 1950, Serial No. 187,306

9 Claims. (Cl. 315—58)

1

This invention relates to a combination pressure indicator and igniter, and particularly to a unit for simultaneously firing an internal combustion engine and accurately measuring pressure variations in a combustion chamber thereof.

In the past, the measurement of pressure changes within a combustion chamber of an internal combustion engine required a special opening in the cylinder head for insertion of a separate pressure-measuring device. This in turn necessitated reworking of the engine head, often an impractical and difficult operation, which previously has frequently precluded the use of pressure indicators for purposes where they would otherwise have been of value. An additional opening also necessarily affects combustion characteristics of the air and fuel mixture by altering the cooling characteristics of the head, by varying the volume of the combustion chamber, or by impeding flame travel due to the projection of the pressure-measuring device into the combustion chamber. In turn, altering the combustion characteristics precluded the possibility of obtaining very accurate indications of actual combustion chamber pressures.

It is therefore a principal object of the invention to provide a pressure-indicating unit which eliminates this need for a special opening in the cylinder head of an internal combustion engine and which accordingly permits more exact measurement of pressure variations within the combustion chamber.

In accordance with the invention, the necessity of forming special indicator openings in the cylinder head of every engine which it is desired to test is eliminated by providing a combination pressure indicator and igniter, such as a spark plug, which are constructed as a single unit, for both igniting the air-fuel mixture in an engine and measuring pressure variations within a combustion chamber thereof. A conventional type of spark plug adapted for insertion in the cylinder head of an engine may be employed as a mount for a length of wire whose resistance varies with its strain. The spark plug shell defines a bore communicating with the combustion chamber and exposed to the pressure effects of the combustion gases therein, a portion of the spark plug shell external of the combustion chamber being machined to a thickness so as to be deformably responsive to pressure changes within the chamber. The strain gauge wire is mounted on this portion of the shell and insulated therefrom. No previous preparation of the engine is necessary and its performance is unaffected by the installation of the device.

2

The pressure indicator thus formed in conjunction with a spark plug of an internal combustion engine exposes the deformable wall of the spark plug shell to the combustion chamber pressure so that changes in this pressure will affect the external dimensions of this wall portion sufficiently to alter the length of the strain gauge wire. The resultant changes in the cross-sectional dimensions of the wire vary its resistance, the latter being a direct indication of the internal pressure to which the shell is subjected. These changes in the resistance of the strain gauge wire may influence suitable recording devices, such as meters or oscillographs, in a known manner.

A further object of the invention is to provide a pressure indicator which is especially suitable for measuring and recording the rapidly fluctuating pressures in combustion chambers because of the small size of the indicator and the high speed response provided thereby. Moreover, the entire strain gauge wire is located outside the combustion chamber and hence cannot possibly affect combustion characteristics, such as flame travel, of the engine.

The use of wire electrically sensitive to strain is particularly advantageous because of its inherent linearity, ease of temperature compensation, and ease of application. Such a wire is also stable and simple to calibrate. The incorporation in the invention of a coolant passage for maintaining the strain gauge wire at a more uniform temperature further aids in eliminating any cyclical resistance indications due solely to temperature variations in the wire or wall itself.

Furthermore, this invention provides an inexpensive, compact, sturdy, accurate and sensitive pressure-indicating unit, one particularly well adapted for measuring the rapid pressure variations encountered in a combustion chamber of an internal combustion engine.

Other objects and advantages of the invention will more fully appear from the following description of the preferred embodiments of the invention shown in the accompanying drawing, in which:

Figure 1 is a fragmentary vertical view of the head of an internal combustion engine and, mounted therein, a spark plug and pressure indicator unit embodying the invention;

Figure 2 is an enlarged vertical view, partly in elevation and partly in section, of the spark plug pressure indicator shown in Figure 1;

Figure 3 is a fragmentary vertical view, partly in elevation and partly in section, of a spark plug provided with a modification of the pressure indicator shown in Figures 1 and 2;

Figure 4 is a sectional view along the line 4—4 of Figure 3; and

Figure 5 is a fragmentary elevational view along the line 5—5 of Figure 3.

Referring more specifically to the drawing, in Figure 1 is shown a combination spark plug and pressure indicator unit, generally designated by 10, mounted in the cylinder head 12 of an internal combustion engine having a combustion chamber 14, a cylinder 16, a piston 18, and a valve port 20 closed by poppet valve 22.

As best shown in Figure 2, the spark plug indicator unit 10 has a metallic shell 24 with its lower portion preferably provided in the usual manner with external threads 26 and its upper portion shown as having the conventional polygonal construction 28 to aid in the installation of the unit in the cylinder head. An insulator 30 of ceramic or other suitable material is positioned within the shell 24 and is preferably seated upon a gasket 32, which in turn is supported by the internal shoulder 34 of the shell. The shell defines a central bore 36 enclosing a tapered lower portion 38 of the insulator 30. This tapered portion is spatially separated from the shell wall and hence permits communication of the bore with the combustion chamber 14 and exposes the bore to the pressure effects of the combustion gases therein.

Within the insulator 30 is a central electrode 40, which projects below the lower end of the insulator. Extending from the upper end of the insulator is a contact terminal 42, which has electrical communication within the insulator with the central electrode. A ground electrode 44, projecting from the lower edge of the threaded portion of the shell 24 and extending transversely across the lower end of the insulator, is spaced from the central electrode 40 to form a spark gap 46.

In the form of the invention shown in Figures 1 and 2, the normally heavy intermediate portion of the shell 24 immediately above the threaded portion 26 is provided with an external annular groove or recess 50. This groove divides the intermediate portion of the shell into upper and lower outwardly extending flanges 52 and 54, respectively, the latter adaptable for seating upon the outer surface of the cylinder head. A thin deformable wall 56 resulting from the formation of the groove 50 has its inner surface exposed to the pressure effects of the combustion gases and its outer surface forming the base of the groove. While thin enough to provide high sensitivity, this deformable wall is sufficiently rigid so that resonance or excessive deflection of the upper part of the spark plug is negligible.

A length of wire 58 whose electrical resistance varies with its strain is coiled around the base of the annular groove 50, this strain gauge wire or resistance wire 58 being of a suitable small size so that a high electrical resistance per unit length is obtained. Inasmuch as the walls of the shell are exposed to the hot combustion gases, it is desirable to employ a wire of a metal or alloy having a low coefficient of thermal expansion and a low temperature coefficient of electrical resistance. The use of such a material reduces any cyclical resistance indications caused solely by temperature variations in the wire rather than by dimensional changes in the deformable wall 56. This is particularly important for measuring small pressure fluctuations where resistance changes due to strain are correspondingly small.

The wire 58 may be secured throughout its length to the base of the annular groove 50 and electrically insulated therefrom by a suitable insulating cement 60, and the turns of the coiled wire may be completely coated with this cement, thereby preventing short circuiting of the electric current through the shell or adjacent turns of the coil. As an alternative, the functions of securing and insulating may be performed independently by coating the wire or the base of the groove, as appropriate, with a film of suitable electrical insulating varnish and winding several turns of the wire tightly over the base with the ends or other appropriate areas of the wire firmly cemented thereto.

In accordance with the invention, the strain gauge wire 58 may be maintained at a more uniform temperature by providing a suitable means for effectively cooling this wire. As best shown in Figure 2, a generally cylindrical sleeve 57 is preferably tightly fitted over the flanges 52 and 54 so as to permit groove 50 to function as an annular coolant passage. A suitable fluid coolant may be introduced into this passage by means of a tube or duct 59 extending through apertures 61 and 63 in the polygonal portion 28 and upper flange 52, respectively, and opening into groove 50. Similarly, an outlet tube for the coolant, corresponding to inlet tube 59, may be fitted into the opposite portions of the polygonal portion 28 and flange 52 so as to extend into the groove 50 for conveying the coolant therefrom.

If no provision is made for electrically insulating the several turns of the coiled wire one from another because the wire is so coiled around the base of the groove 50 that these turns do not come into contact, the coolant circulated through the coolant passage should be a suitable electrically non-conductive fluid, such as transformer oil, to prevent short circuiting of the electric current through the cooling medium.

Employment of a coil of such wire permits the measurement of the average strain throughout the wall 56 and thus eliminates the possibility of the obtained readings being affected by any minor variations in wall thickness or by the possible existence of any high pressure points.

External leads 62 and 64 may be secured to the strain gauge wire 58 by soldering or other suitable means. These leads, which are shown as encased in a suitable conduit or tube 66 extending through the upper outwardly extending flange 52 and the polygonal portion 28 of the shell, provide electrical connection between the wire 58, a suitable source of electric current, and an appropriate measuring device, not shown, such as an oscillograph. Of course, the leads 62 and 64, as indicated at 67 in Figure 2, are electrically insulated from each other and from the conduit if the latter is of an electrically conductive material. A vertically extending opening 68 is shown as provided in the polygonal portion 28 of the shell 24 for supporting the conduit 66.

The air-fuel mixture within the combustion chamber 14 is ignited by the spark plug, and as the pressure within the bore 36 of the spark plug increases during combustion of the gases, the thin deformable wall 56 is bulged outwardly throughout its circumference. The increased periphery of this wall portion elongates the strain gauge wire 58, thereby decreasing its cross-sectional area and accordingly increasing its electrical resistance. These changes in electrical resistance are direct indications of the combustion chamber pressure and may be measured by appropriate electrical means, as hereinbefore indicated.

The modification of the pressure indicator unit shown in Figures 3 and 4 has a recess or slot 70 machined in one side of the intermediate portion 48 of the spark plug shell to a suitable depth to form a thin deformable wall 72. A wall thickness in the order of 0.006 inches has been found to be highly satisfactory both from the standpoint of necessary deflectability and structural rigidity. On the outer surface of the deformable wall 72 is mounted a section of strain gauge wire 74 of the type hereinbefore described. This wire may be mounted on the base of the recess 70 at the area of greatest deformability of the wall 72, as best shown in Figure 4, the wire 74 preferably extending transversely back and forth across this deformable wall area in the form of a grid, as shown in Figure 5.

Suitable insulating cement 76, such as the type referred to in the description of the form of the pressure indicator shown in Figures 1 and 2, may be used to both secure the strain gauge wire to the recess base and electrically insulate it therefrom. Alternatively, the wire or the recess could be coated with an insulating varnish with the wire being cemented or otherwise suitably secured to the groove base only at appropriate spots, thereby preventing short circuiting of the electric current.

The deformable wall portion 72 of the shell expands and contracts in accordance with pressure fluctuations within the spark plug bore 36 and the combustion chamber 14, thereby varying the resistance of the strain gauge wire 74 accordingly. Lead wires 82 and 84 each connect one end of the short section of the strain gauge wire to a suitable source of electricity and an appropriate measuring device, not shown, as previously explained. It is preferable to secure the lead wires to the side walls 78 and 80 of the recess 70 and insulate them therefrom to prevent any objectionable vibration of these wires during operation of the engine.

Although this modification is not shown as provided with a means of cooling the strain gauge wire 74, a coolant passage somewhat similar to the one formed by groove 50 and sleeve 70 shown in Figures 1 and 2 may likewise be provided in this modification for the purposes hereinbefore set forth. In this instance the construction could comprise a member fitted over the recess 70 with the inlet and outlet tubes or ducts for the coolant communicating with opposite ends of the recess for efficient cooling of the wire.

This modification minimizes the problem of nonuniform stress distribution by providing a very small deformable wall area.

For purposes of illustration, the dimensions of some of the parts of the pressure indicators, such as the dimensions of the strain gauge wire and the thicknesses of the deformable portions of the shell walls, have been exaggerated in the drawing.

While the described embodiments of the present invention constitute preferred forms, it is to be understood that other modifications and variations in details of structure and arrangement may be made without departing from the scope of the invention as defined in the appended claims.

We claim:

1. A unit for both igniting a fuel mixture in a combustion chamber an measuring pressure changes therein, said unit comprising an igniter having a shell which is mountable adjacent said chamber and which defines a bore adapted to communicate therewith, a portion of the wall of said shell formed of a predetermined thickness permitting it to be deformably responsive to pressure variations within the combustion chamber, and a length of wire whose resistance varies with its strain positioned on said deformably responsive wall portion.

2. A unit for both igniting the air-fuel mixture in a combustion chamber of an internal combustion engine and measuring pressure changes therein, said unit comprising a spark plug having an outer shell mountable in said engine and defining a bore adapted to communicate with said combustion chamber, a portion of the wall of said shell formed of a predetermined thickness permitting it to be deformably responsive to pressure variations within the combustion chamber, a length of wire whose resistance varies with its strain positioned on said deformably responsive wall portion, and a means for cooling said wire.

3. A high speed response pickup unit adaptable for insertion in the cylinder head of an internal combustion engine for simultaneously firing said engine and measuring pressure variations within the combustion chamber thereof, said unit comprising a spark plug having an outer shell defining a bore communicating with the combustion chamber and exposed to the pressure changes therein, a portion of the shell external of the combustion chamber having its outer periphery provided with a recess forming a deformable wall responsive to said pressure changes, and a wire whose electrical resistance varies with its strain mounted on the base of said recess and electrically insulated from the shell, said wire being adapted for electrical connection with a source of electric current and with means for measuring changes in the electrical resistance of said wire.

4. A unit adaptable for insertion in the cylinder head of an internal combustion engine for simultaneously firing said engine and measuring pressure variations within the combustion chamber thereof, said unit comprising a spark plug having an outer shell defining a bore communicating with the combustion chamber and exposed to the pressure changes therein, a portion of the shell external of the combustion chamber having its outer periphery provided with a recess forming a deformable wall responsive to said pressure changes, a member fitted over said shell portion forming with the recess a passage for circulating a fluid coolant therethrough, means associated with the passage for conveying a coolant to and from said passage, and a wire whose electrical resistance varies with its strain mounted on the base of said recess and electrically insulated from the shell.

5. A combination spark plug and pressure-measuring unit adapted to be mounted in the cylinder head of an internal combustion engine for simultaneously firing said engine and measuring pressure fluctuations within a combustion chamber thereof, said unit comprising a spark plug having an outer shell defining a bore for communication with said combustion chamber, said shell provided with a reduced neck portion dimensionally responsive to pressure variations with the bore and having its outer surface external of said combustion chamber, and a strain gauge wire coiled around said neck portion and secured thereto throughout the working length of said wire so that dimensional changes of the neck portion due to pressure variations within the combustion chamber vary the strain and hence the electrical resistance of said wire element, said wire being electrically insulated from said shell and adapted for electrical connection with resistance-measuring means.

6. In a spark plug adaptable for insertion in the cylinder head of an internal combustion engine, an outer shell for said spark plug defining a bore extending therethrough and adapted for communication with a combustion chamber in said engine, said shell having its outer surface provided with an annular recess external of said combustion chamber to form an annular wall portion of reduced thickness which is deformable by pressure variations within the combustion chamber, a wire electrically sensitive to strain coiled around the base of said recess and electrically insulated from said shell so as to be strained in accordance with the deformation of said wall portion, and electrical leads associated with said wire for electrical connection with means for measuring resistance changes therein.

7. A combination igniter and pressure indicator unit comprising a spark plug having an outer shell adaptable for insertion in the cylinder head of an internal combustion engine, said shell defining a bore extending therethrough adapted for communication with a combustion chamber in said engine, said shell having its outer surface provided with an annular recess external of said combustion chamber to form an annular wall portion of reduced thickness which is deformable by pressure variations within the combustion chamber, a sleeve member fitted over said recess to define with the recess walls a passage for the circulation therethrough of a fluid coolant, inlet and outlet ducts communicating with the passage for conveying a coolant to and from said passage, a wire electrically sensitive to strain coiled around the base of said recess and secured thereto but insulated therefrom so as to be strained in accordance with the deformation of said wall portion, and electrical leads associated with said wire for electrical connection with means for measuring resistance changes therein.

8. A pressure-indicating unit for simultaneously firing an internal combustion engine and measuring pressure variations within a combustion chamber thereof, comprising a spark plug provided with an outer shell for mounting in the cylinder head of said engine, said shell provided with a central bore adapted for communication with said combustion chamber, a portion of said shell exterior of said combustion chamber provided with an external slot extending transversely to said bore and forming a thin wall deformable by pressure changes within the combustion chamber, and a section of strain gauge wire mounted on the base of said slot at the area of greatest deformability so as to be strained by dimensional changes in said wall portion, said wire being electrically insulated from said shell and having external leads associated therewith for electrical connection with means for measuring changes in the resistance of said wire.

9. A unit for both igniting a fuel mixture in a combustion chamber and measuring pressure changes therein, said unit comprising an igniter having a shell mountable adjacent said chamber and defining a bore adapted to communicate therewith, and a length of wire whose resistance varies with its strain secured to a wall of said unit which is deformably responsive to pressure variations within the combustion chamber.

THOMAS C. VAN DEGRIFT.
CHARLES W. GADD.
RALPH S. MATSEN.

References Cited in the file of this patent

UNITED STATES PATENTS

| Number | Name | Date |
|---|---|---|
| 1,861,021 | Martin | May 31, 1932 |
| 2,472,045 | Gibbons | May 31, 1949 |
| 2,477,026 | Wenk et al. | July 26, 1949 |